US009022106B1

(12) United States Patent
McCoy (10) Patent No.: US 9,022,106 B1
(45) Date of Patent: May 5, 2015

(54) DOWNHOLE DIVERTER GAS SEPARATOR (76) Inventor: James N. McCoy, Wichita Falls, TX (US)

( * ) Notice: Subject to any disclaimer, the term of this patent is extended or adjusted under 35 U.S.C. 154(b) by 365 days.

(21) Appl. No.: 13/530,329

(22) Filed: Jun. 22, 2012

(51) Int. Cl.
*E21B 43/38* (2006.01)
*E21B 43/12* (2006.01)

(52) U.S. Cl.
CPC *E21B 43/38* (2013.01); *E21B 43/12* (2013.01)

(58) Field of Classification Search
CPC ........................................................ E21B 43/38
USPC ............... 166/243, 203, 105.5, 106, 105, 369
See application file for complete search history.

(56) References Cited

U.S. PATENT DOCUMENTS

| | | | |
|---|---|---|---|
| 1,578,720 A | 3/1926 | Derby | |
| 1,665,540 A | 4/1928 | Green | |
| 1,674,815 A * | 6/1928 | Barnhart | 166/105.5 |
| 2,429,043 A | 4/1943 | Barnhart | |
| 2,525,233 A | 6/1947 | Miller | |
| 2,528,448 A | 10/1950 | Munk | |
| 2,748,719 A | 6/1956 | Wells | |
| 2,764,102 A | 9/1956 | Abdo et al. | |
| 2,843,053 A | 7/1958 | Carle | |
| 2,872,985 A | 2/1959 | Bertuzzi et al. | |
| 2,883,940 A | 4/1959 | Gibson | |
| 3,128,719 A | 4/1964 | Jongbloed et al. | |
| 3,791,444 A | 2/1974 | Hickey | |
| 4,074,763 A | 2/1978 | Stevens | |
| 4,088,459 A | 5/1978 | Tuzson | |
| 4,231,767 A | 11/1980 | Acker | |
| 4,241,788 A | 12/1980 | Brennan | |
| 4,366,861 A | 1/1983 | Milam | |
| 4,481,020 A | 11/1984 | Lee et al. | |
| 4,531,584 A | 7/1985 | Ward | |
| 4,573,529 A | 3/1986 | Reinhardt | |
| 4,624,310 A | 11/1986 | Echols et al. | |
| 4,643,258 A | 2/1987 | Kime | |
| 4,676,308 A * | 6/1987 | Chow et al. | 166/369 |
| 4,867,242 A | 9/1989 | Hart | |
| 5,271,725 A | 12/1993 | Freet et al. | |
| 5,303,774 A * | 4/1994 | Duhn et al. | 166/191 |
| 5,343,945 A | 9/1994 | Weingarten et al. | |
| 5,653,286 A | 8/1997 | McCoy et al. | |
| 6,237,691 B1 | 5/2001 | Kelley et al. | |
| 7,104,321 B2 * | 9/2006 | Carruth | 166/265 |
| 7,475,731 B2 * | 1/2009 | Victor | 166/372 |
| 2007/0012448 A1 * | 1/2007 | Rogers et al. | 166/291 |

* cited by examiner

*Primary Examiner* — Brad Harcourt
*Assistant Examiner* — Steven MacDonald
(74) *Attorney, Agent, or Firm* — Dan Brown Law Office; Daniel R. Brown (57) ABSTRACT

An oil and gas well downhole gas separator defines an outer annulus between the well casing and a separator tube having a lower end fluid inlet, and an inner annulus with a fluid conduit disposed inside. An inlet fitting and an outlet manifold route the fluids, liquids, and gases through a gravity separation sequence. A liquid outlet at the upper end is coupled to a downhole pump. A draw tube is coupled to the inlet fitting at the lower end. The draw tube also supports a casing flow diverter that slideably engages the well-bore casing so as to resist the movement of well fluids thereby while allowing the separator to move along a longitudinal axis of the well-bore casing, facilitating insertion into and removal from the well casing, and allowing for well tubing stretch during operation.

30 Claims, 9 Drawing Sheets

Section A

Fig. 5

Section B

DOWNHOLE DIVERTER GAS SEPARATOR

BACKGROUND OF THE INVENTION

1. Field of the Invention

The present invention relates to the separation of gas and liquid from gas-liquid mixtures on a continuous basis, and relates more specifically to downhole gas anchors employed in oil and gas wells.

2. Description of the Related Art

In oil and gas reservoirs, petroleum oil is frequently found in intimate association with natural gas, both in the form of free gas bubble entrained in the oil and in the form of dissolved gas in the oil. Water is also commonly present in the reservoir fluids. Thus, well fluids commonly comprise both liquids and gas. In wells where pumping is necessary, the presence of this gas-liquid mixture materially affects the efficiency of pumping operations. In addition to the free gas in the mixture, the pressure decrease inherent at the suction of the pump inlet causes some of the dissolved gas to form more bubbles of free gas. The bubbles of free gas occupy part of the displacement of the pump, which results in reduced pumping efficiency. If the quantity of gas accumulates to a sufficient proportion, it will expand and contract to such a degree that the pump becomes gas locked, unable to cycle it's its flow control valves, and unable to pump any liquids at all.

A downhole reciprocating rod pump is the most common type of well pump being used today. Typically, the downhole rod pump is suspended by the tubing string and driven by a reciprocating surface unit through a string of sucker rods. The downhole pump is mounted at the bottom of the tubing string and pumps well liquids to the surface through the tubing string, while gas occupies an annulus between the tubing string and the well casing. The suction inlet of the pump is positioned below the liquid level in the well. In wells where bubbles of gas are present, it is known in the art to use a "gas anchor" to continuously separate the gas from the liquids before the liquid enters the inlet of the pump, the liquids being directed to the suction inlet of the pump and the gas being directed to the annulus. Thus, the gas anchor is typically connected to the suction inlet of the downhole pump, and is therefore located just below the pump itself. The efficiency of the separation of liquid and gas by the gas anchor is a critical aspect of the gas anchor design, and it should be noted that no gas anchor is totally effective in this separation process.

In addition to the gas-liquid separation efficiency of the gas anchor, it should be appreciated that the gas anchor is typically located thousands of feet below the surface, so reliability is also critically important. It is further important for a gas anchor design to facilitate its insertion and removal from the well bore casing using convention oil field service systems and techniques. It is further important to address the practicalities of well field operations, including abusive handling practices, oil fluid impurities, solids, abrasion, and unexpected failure of other well components. Given the high value of efficient oil well production, the expense of operating and maintaining wells, and the cost of servicing well, it can readily be appreciated that there is a need in the art for cost effective, reliable, and efficient gas-liquid separators.

SUMMARY OF THE INVENTION

The need in the art is addressed by the apparatus of the present invention. The present disclosure teaches a gravity fluid separator inserted into a casing that contains a fluid blend of a liquid portion and a gaseous portion. The separator includes an elongated separator tube with a lower end and an upper end, which has a liquid inlet opening formed through a side wall thereof, and located adjacent to the lower end. The elongated separator tube defines an outer annulus with the casing. A fluid conduit is disposed within the elongated separator tube, with a length substantially coextensive therewith, which defines an inner annulus therebetween. An inlet fitting is sealably disposed at the lower end of the elongated separator tube, and fluidly coupled to the fluid conduit. An outlet manifold is sealably disposed at the upper end of the elongated separator tube, which has a fluid passage that fluidly couples the fluid conduit to the outer annulus through a fluid outlet that is aligned along the side wall. The outlet manifold further has a liquid passage that fluidly couples the inner annulus to a liquid outlet directed upwardly at the upper end. A draw tube is coupled to the inlet fitting, and extends downwardly to a fluid blend inlet end. A casing flow diverter is disposed on the exterior of the draw tube and proportioned to slideably engage the casing, thereby resisting the movement of the fluid blend thereby while allowing the draw tube to move along a longitudinal axis of the casing. During operation, a pressure differential between the liquid outlet and the fluid blend inlet induces fluid flow, which urges the fluid blend into the fluid blend inlet, to pass through the inlet fitting and upwardly through the fluid conduit, and through the fluid passage and into the outer annulus through the fluid outlet. Then, gravity induces most of the gaseous portion within the outer annulus to rise, while the differential pressure induces the liquid portion to travel downwardly through the outer annulus and enter the inner annulus through the liquid inlet opening, and to further flow upwardly through the inner annulus, passing through the liquid passage and upwardly out of the liquid outlet.

In a specific embodiment of the foregoing apparatus, the liquid inlet opening consists of plural holes formed through the sidewall of the elongated separator tube. In another specific embodiment, the elongated separator tube and the fluid conduit have round cross sections. In another specific embodiment, the inlet fitting threadably engages the draw tube. In another specific embodiment, the outlet manifold further includes an outlet coupling disposed about the liquid outlet. In a refinement to this, the outlet coupling is threaded to engage the suction inlet of a pump.

In a specific embodiment of the foregoing apparatus, the draw tube further includes a collar disposed about its exterior surface and adjacent to the fluid blend inlet for retaining the diverter on the draw tube. In a refinement to this embodiment, the collar is located on the draw tube by a shear pin, thereby enabling the diverter to slide off the draw tube in the presence of excessive shear forces.

In a specific embodiment of the foregoing apparatus, the elongated separator tube has a length within the range of forty-eight to one-hundred twenty inches. In a particular embodiment, the elongated separator tube has a length of approximately sixty inches. In another specific embodiment of the foregoing apparatus, the diverter slideably engages an exterior surface of the draw tube, thereby further enabling the longitudinal movement.

In a specific embodiment to the foregoing apparatus, the casing flow diverter is configured as a disc having an outer diameter selected to fit within an interior diameter of the casing, and having a mounting hole formed therethrough sized to engage an exterior surface of the draw tube. In a refinement to this embodiment, the disc is formed of a polymeric material. In another refinement, the mounting hole includes a metal liner. In another refinement, the polymeric material is selected from polyethelene, acetal, fluoropolymers and fluoroethelenes. In another refinement, the diverter is comprised of plural discs. In anther refinement, the disc is cupped to facilitate insertion into the casing.

In a specific embodiment of the foregoing apparatus, the outer diameter of the draw tube, the inlet fitting, and the outlet manifold are within ten percent of the outer diameter of the elongated separator tube, thereby facilitating insertion and removal of the gravity fluid separator apparatus with the casing.

In a specific embodiment of the foregoing apparatus, where the casing is a subterranean hydrocarbon well casing, and the fluid blend contains crude oil, water, and natural gas, and where the fluid blend is withdrawn from the casing by a pump with a suction inlet, the fluid outlet is coupled to the suction inlet, which enables the pump to duce the pressure differential to induce flow. In a refinement to this embodiment, where the natural gas rise velocity within the liquid portion is known to be approximately six inches per second, the cross sectional area of the outer annulus and the rate of flow induced by the pump are selected to result in a rate of downward flow through the outer annulus that is less than six inches per second, thereby enabling the gaseous portion to escape from the liquid portion prior to entering the liquid inlet.

The present disclosure teaches a downhole gas and liquid separator for connection to a suction inlet of a downhole pump, and for insertion into a well-bore casing, and for separating well fluids including natural gas and well liquids consisting of crude oil and water. The apparatus includes an elongated separator tube with a lower end and an upper end, and with a well liquid inlet formed as plural holes through a side wall thereof, which are located adjacent to the lower end, and where the elongated separator tube defines an outer annulus when inserted into the well-bore casing. A fluid conduit is disposed within the elongated separator tube, having substantially the same length, which defines an inner annulus therebetween. An inlet fitting is sealably disposed at the lower end of the elongated separator tube, and is fluidly coupled to the fluid conduit. An outlet manifold is sealably disposed at the upper end of the elongated separator tube, and has a well fluid passage that fluidly couples the fluid conduit to the outer annulus through a well fluid outlet that is aligned along the side wall. The outlet manifold further has a well liquid passage that fluidly couples the inner annulus to a well liquid outlet coupling configured to engage the suction inlet of the downhole pump. A draw tube is coupled to the inlet fitting, which extends downwardly to a well fluid inlet end. A casing flow diverter is disposed on the exterior of the draw tube and is proportioned to slideably engage the well-bore casing, thereby resisting the movement of the well fluids thereby while allowing the draw tube to move along a longitudinal axis of the well-bore casing. The well liquid outlet is adapted for coupling with the suction inlet of the pump, which can induce a pressure differential between the well liquid outlet and the well fluid inlet. During operation, the pressure differential urges the well fluids into the well fluid inlet, to pass through the inlet fitting and upwardly through the fluid conduit, and through the well fluid passage and into the outer annulus through the fluid outlet. Then, gravity induces most of the natural gas within the outer annulus to rise, while the differential pressure induces the well liquids to travel downwardly through the outer annulus and enter the inner annulus through the well liquid inlet opening, and to further flow upwardly through the inner annulus, passing through the well liquid passage and upwardly out of the well liquid outlet and into the downhole pump.

In a specific embodiment of the foregoing apparatus, the elongated separator tube and the fluid conduit have round cross sections. In another specific embodiment, the casing flow diverter slideably engages an exterior surface of the draw tube, thereby further enabling the longitudinal movement. In another specific embodiment, the draw tube further includes a collar disposed about its exterior surface and adjacent to the well fluid inlet for retaining the casing flow diverter on the draw tube. In a refinement to this embodiment, the collar is located on the draw tube by a shear pin, thereby enabling the casing flow diverter to slide off the draw tube in the presence of excessive shear forces.

In a specific embodiment of the foregoing apparatus, the elongated separator tube has a length of approximately sixty inches. In another specific embodiment, the casing flow diverter is configured as a disc having an outer diameter selected to fit within an interior diameter of the well-bore casing, and has a mounting hole sized to engage an exterior surface of the draw tube. In a refinement to this embodiment, the disc is formed of a polymeric material, and the mounting hole includes a metal liner. In another refinement, the casing flow diverter is comprised of plural discs. In another refinement, the disc is cupped to facilitate insertion into the well-bore casing.

In a specific embodiment of the foregoing apparatus, the outer diameter of the draw tube, the inlet fitting, and the outlet manifold are within ten percent of the outer diameter of the elongated separator tube, thereby facilitating insertion and removal of the downhole gas anchor into and out of the well-bore casing.

In a specific embodiment of the foregoing apparatus, where the natural gas rise velocity within the well liquids is known to be approximately six inches per second, the cross sectional area of the outer annulus and the rate of flow induced by the downhole pump are selected to result in a rate of downward flow through the outer annulus that is less than six inches per second, thereby enabling the natural gas to escape from the well liquids portion prior to entering the well liquid inlet.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Most downhole liquid and gas separators, also referred to as "gas anchors", in use in the oil and gas industry employ gravity separation. The flow of well fluids, comprising crude oil, water, and natural gas, is routed into a vertical orientation where the gas bubbles are allowed to rise upwardly and out of the well fluids. The well liquids are then drawn away and then pumped to the surface. In most oil wells, the gas flows out of the well through the well-bore casing, while the liquid is pumped to the surface through a tubing string that is disposed within the casing. As an aid to clarity, in this disclosure, "fluid" is used to describe a blend of both gas and liquids, which may contain crude oil and water, such as the raw well fluids that enter the well casing from the adjacent geologic formation. "Gas" is used to describe that portion of the fluids that comprises little or no liquids, which would be natural gas in the case of an oil or gas well. And, "liquid" is used to describe fluids after the removal of most of the gas therefrom. It will be a appreciated by those skilled in the art that even the most efficient downhole gas anchors cannot remove 100% of the gas from the well fluids. This is due, in part, to the fact that the gases are soluble in the liquids such that changes in temperature, pressure, and even agitation, can cause additional gas to escape from solution. The goal of any gas anchor is to separate as much gas from the fluids as possible, which enables the pumping efficient and production rate of the well to increase.

Gas bubbles rise upwardly in oil or water under the force of gravity, and at a rate of approximately six inches per second. Thus, gas bubbles will be released from a fluid column if the downward liquid velocity is less than six inches per second. In order to achieve gas separation by force of gravity, it is necessary to control the flow of well fluids in the separation region to be moving downwardly at a velocity of less than six inches per second. However, the solution to effective gas separation is not simply to move the fluids as slowly as possible, because it is also desirable to move as high a volume of liquids out of the well as possible. A liquid column having an area of one square inch travelling at six inches per second is a flow rate of approximately fifty barrels per day. Thus, it is significant to consider the cross sectional area of the separation chamber and pumping volume in determination an optimum gas anchor design. In a well bore having a four to six inch internal diameter, the allocation of cross section area for gas separation, liquid pumping, and other fluid routing functions is critical to efficient separator design.

The present invention advantageously utilizes an annulus between the inside surface of the well casing and a separator tube to yield the largest practicable sectional area as a separation chamber while still providing other fluid conduit requirements. In order to accomplish this, there must be an isolation means disposed within the well bore casing so that the separation chamber is not continuous with the section of the casing that is perforated for inflow of formation fluids into the casing. Were there no means for isolation, the gases from the raw well fluids would be entrained into any liquid inlet to the gas anchor. In the present disclosure, the isolation means is referred to as a "diverter" because it diverts the flow of raw well fluids away from the annulus used from gas separation. Installing, operating, maintaining, and removing such an isolation means from a well bore casing creates a great number of issues for engineers and operators.

It is know in the art of oil and gas wells to employ a "packer" assembly, which is used to rigidly fix the well's tubing string to the well casing at the location of the packer, which may be deep in the well, and even at the location of a downhole pump. There are a number of technical reasons why it may be desirable to install a packer, but they are beyond the scope of this disclosure. While a packer may isolate the fluids below it from the fluids above it, the essential problems with using a packer as a casing flow isolation means is that the packer constricts movement of the tubing string along the vertical axis of the well. This constriction must be addressed elsewhere in the well design, such as allowing the tubing string at the surface to move, or by adding tension to the tubing string at some point on its length. Otherwise, the expansion and contraction, and the forces of pump operation and fluid movement would cause undue stresses and buckling to occur. In addition, the installation and removal of a packer from a well requires a specialized process of inserting the packer unit, and then expanding it to engage the interior wall of the case, and the converse to remove it. There are many wells in operation, and many more that will be built in the future, where the use of a packer is simply not desirable. The use of a slideable diverter as taught in the present disclosure enables such wells to utilize the efficient gas anchor of the present invention.

Figure 1:
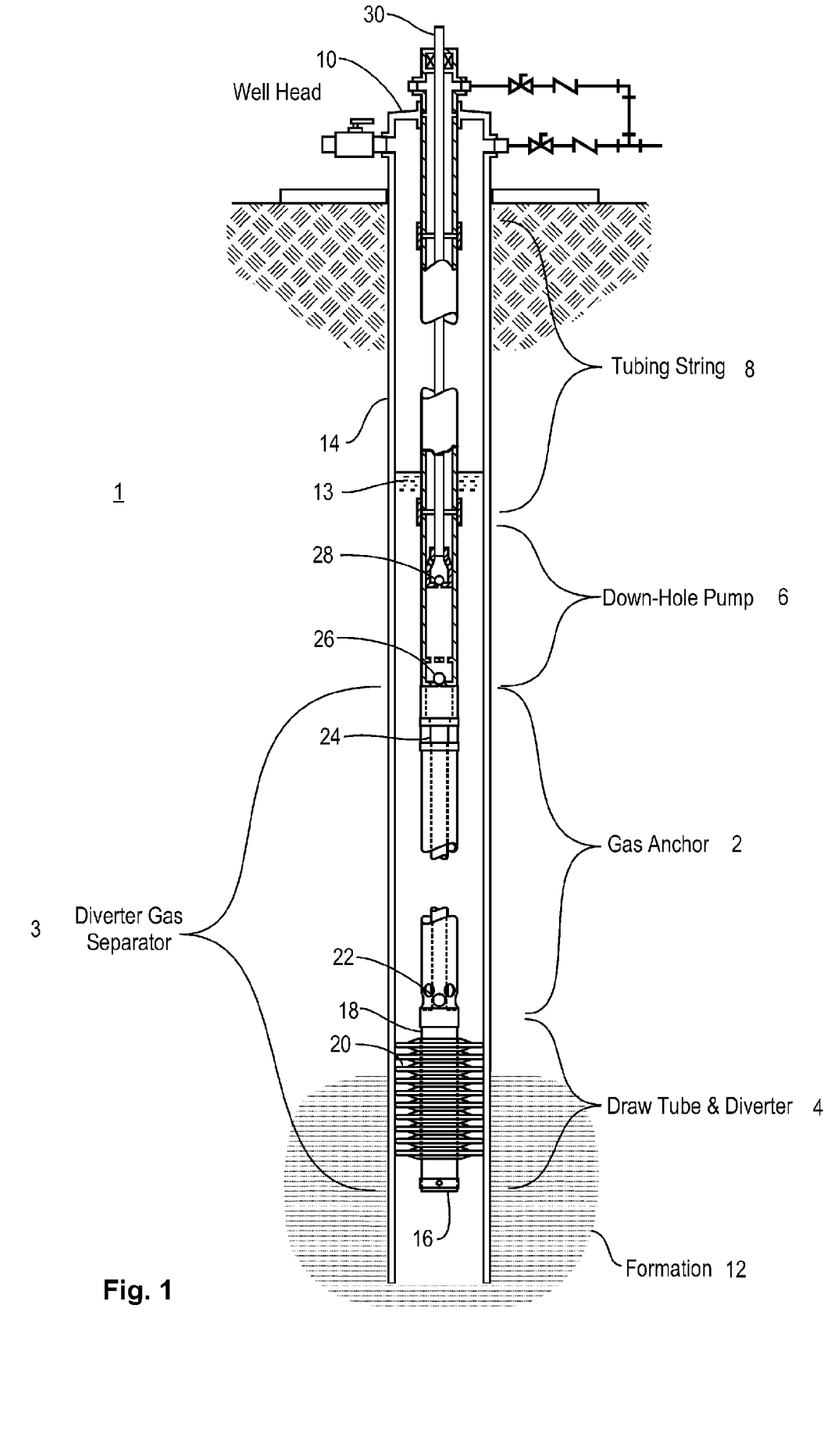
FIG. 1 is a cross section view of an oil well with a downhole diverter gas separator installed according to an illustrative embodiment of the present invention.

Reference is directed to FIG. 1, which is a cross section view of an oil well 1 with a downhole diverter gas separator 3 installed according to an illustrative embodiment of the present invention. As in known, the oil well 1 is built by drilling a subterranean wellbore into an oil producing geologic formation 12. The wellbore is lined with a casing 14. A wellhead 10 is attached to the top of the casing 14, and also supports a tubing string 8, through which well fluids are pumped to the surface and out of the wellhead 10. The tubing string 8 extends below the liquid level 13 in the casing 14, and has a downhole pump 6 attached to its lower end. This enables the downhole pump 6 to pump liquids to the wellhead 10 through the tubing string 8. The most common downhole pump type is a surface driven sucker rod pump 6, which is what is illustrated in FIG. 1. A sucker rod 30 drives a travelling valve 28 cyclically up and down within the pump 6. A stationary valve 26 at the pump 6 inlet functions in concert with the travelling valve 28 such that liquids are both drawn into the pump 6 and pumped upward on each pump upstroke.

In FIG. 1, the pump 6 has an inlet at its lower end that is coupled to the diverter gas separator 3 of the illustrative embodiment. The diverter gas separator 3 is comprised to two portions; a gas anchor portion 4, and a draw tube and diverter portion 4. Both are suspended at the bottom of the pump 6, which is suspended in turn, by the tubing string 8. Note that the casing 14 is generally fixed in position to the adjacent formation 12 and wellbore. On the other hand, the tubing string 8, pump 6, and gas separator 3 are 'live' and subject to movement during operation. The forces of gravity, the weight of the liquid column in the tubing string, and the dynamics of pump operation cause the downhole components to move up and down over time.

The gas anchor 2 portion in FIG. 1 is fluidly coupled to the pump 6 inlet and delivers well liquids thereto. Raw well fluids are dawn in though an inlet 16 of the draw tube and diverter 4 and travel upwardly through the gas anchor and out a fluid outlet 24 near the top of the gas anchor 2. The fluids then travel slowly down to a liquid inlet 22 near the bottom of the gas anchor 2. It is during this time that the gas bubbles rise and exit the well through the well bore casing 14. The fluids from the formation 12 are isolated from this separation process by the diverter 20, which is a series of polymeric discs in the illustrative embodiment. The diverters 20 are disposed on a draw tube 18, which acts as an inlet conduit to the gas anchor 2. The diverter discs 20 engages the casing 14 to provide the isolation function, but can slide up and down with movement of the tubing string 8. In addition, the diverter discs 20 may slide along the draw tube 18 to allow for further vertical movement tolerance. The slideable arrangement of the diverter 20 also facilitates installation of the diverter gas separator 3 into the well, and later removal as well. Since the diverter discs 20 must travel all the way from the surface to the formation area, which may be several thousand feet, the design of the diverter discs must take the installation process into consideration. The diverter discs 20 can have a slightly smaller diameter that the inside diameter of the well casing 14 to facilitate this downward travel without undue resistance. The use of plural discs 20 facilitates the isolation function despite this smaller diameter. The diverter discs 20 may also be fabricated from a resilient material to enable the discs 20 to flex and pass by irregularities in the wellbore casing 14 without damage. Also, it is known that as a tubing string is lowered into a well, couplings are attached as each tubing section is added. The installation rig at the surface level may raise the tubing string a few inches in the process of attaching each new coupling, which results in a brief upward reversal of the direction of the tubing string 8 moving down the well. To facilitate this short upward movement, the draw tube 18 has additional length over what is needed to support the plural discs, and, the discs can slide along the draw tube 18. It is useful for the extended length of the draw tube to be twelve to twenty-four inches. Then, if the tubing rises a few inches, the discs 20 do not actually move upward, but rather slide that distance on the draw tube 18, thereby protecting the discs 20 from the reversal forces of the installation process.

Figure 2:
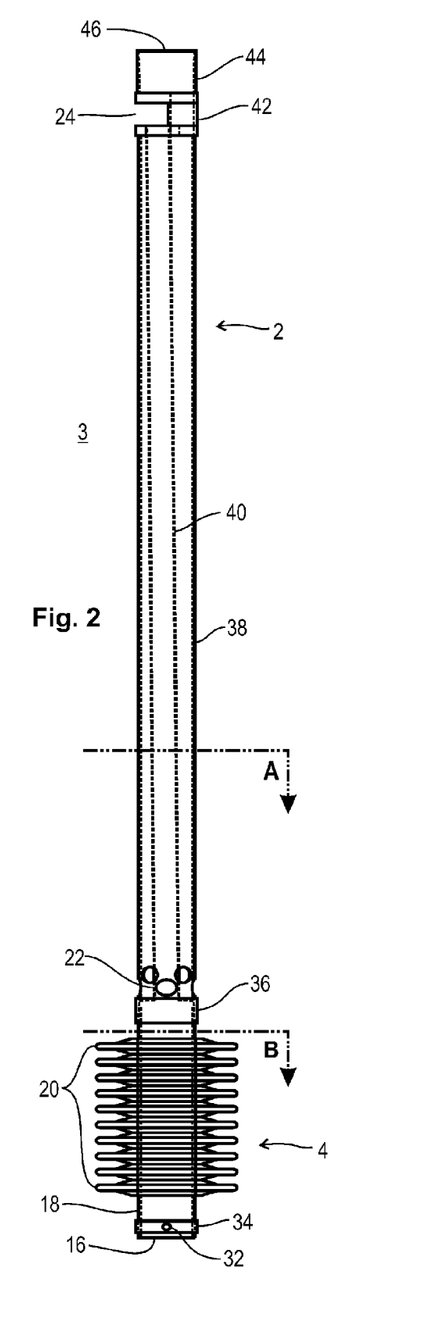
FIG. 2 is a drawing of a gas anchor and diverter assembly according to an illustrative embodiment of the present invention.

Reference is directed to FIG. 2, which is a drawing of a gas anchor 2 and diverter 4 assembly 3 according to an illustrative embodiment of the present invention. An elongated separator tube 38 has plural liquid inlet openings 22 formed therethrough at its lower end. The lower end is sealably terminated by an inlet fitting 36. The inlet fitting 36 is coupled to a fluid conduit 40, which is disposed within the elongated separator tube 40. The inlet fitting 36 directs inlet fluids through the fluid conduit 40, and upwardly to an outlet manifold 42, which is sealably coupled to the upper end of the elongated separator tube 38. The outlet manifold 42 fluidly couples the inlet fluids to the fluid conduit 40, and out of a fluid outlet 24, which is arranged in alignment with the outside wall of the elongated fluid tube 38. The outlet manifold 42 further fluidly couples liquids within the annulus between the elongated separator tube 38 and the fluid conduit 40 out through an outlet coupling 44 to a liquid outlet 46 at the top end of the separator 3. The inlet fitting 36 is coupled to a draw tube 18 which routes raw well fluids upwardly to the inlet fitting 36. Plural diverter discs 20 are disposed on the exterior of the draw tube 18. The diverter discs 20 are retained on the draw tube 18 by a collar 34. The collar 34 is retained on the draw tube 18 be one or more shear pins 32.

The function of the shear pins 32 in FIG. 2 is significant. While the diverter 20 generally enables vertical movement of the separator 3 within the well casing (not shown), it is possible that the diverter could become lodged within the casing over time. This could make removal of the tubing string, down hole pump, and separator 3 problematic. The shear pins enable the operator to apply sufficient force to withdraw the assembly and service as required. In the illustrative embodiment, the shear force is preset to four thousand pounds by default, although other force settings can be used. In the case that the shear pins 32 fail, only the diverter 20 would remain in the well, while all the other downhole components can be withdrawn. The diverter could then be otherwise removed, or pushed downward into the well, to enable the operator to install a new set of diverter discs on the separator 3 for reinstallation.

Figure 3:
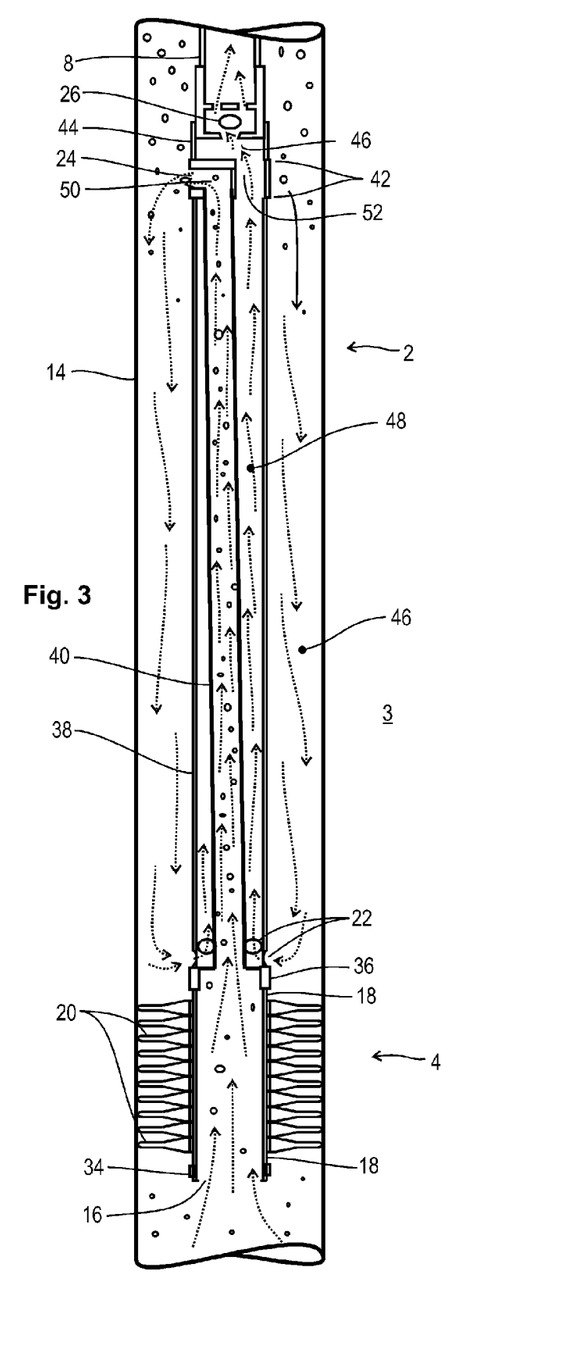
FIG. 3 is a schematic diagram of downhole diverter gas separator during operation.

Reference is directed to FIG. 3, which is a schematic diagram of downhole diverter gas separator during operation. This schematic provides further details on fluid, liquid, and gas movement during active pumping operation through the diverter. The well casing 14 is shown at the location of the down hole pump 8 and the gas anchor 2 and diverter assembly 4. The dotted arrows generally show the movement of liquid and fluid, and the bubble graphics show the location of gas bubbles in the system. Raw well fluids, which are a blend of crude oil, water, and natural gas, enter the fluid blend inlet 16 at the bottom of the draw tube 18. It should be noted that the motive force for fluid movement is the negative pressure differential with respect to the formation pressure, created by the action of the pump 8. More particularly, the upstroke of the pump 8 causes an evacuated condition in the pump 8 that draws the stationary valve 26 open, communicating the negative pressure of the pump inlet to the liquid outlet 46 of the gas anchor 2. As the well fluids are drawn into the fluid blend inlet 16, they flow upward and enter the fluid conduit 40, routed by the inlet fitting 36. The diverter discs 20 on the draw tube 18 isolate the well fluids from moving upward within the casing 14. The diverter discs 20 are retained on the draw tube 18 by collar 34. The well fluids, containing liquids and gas are drawn from the fluid conduit 40 into the outlet manifold 42, which has two isolated passages.

The outlet manifold passages include a fluid passage 50, which fluidly couples the well fluids from the fluid conduit 40 to a fluid outlet 24. The fluid outlet 24 is disposed on the side wall of the gas anchor 2, and discharges into the outer annulus 46 defined between the elongated separator tube 38 and the well casing 14. The outer annulus 46 has the largest cross sectional area of any fluid channel in the separator, and is therefore the area of slowest vertical flow, which is designed to be less than six inches per second in the illustrative embodiment. Therefore, the gas bubbles rise upwardly in the casing 14 under the force of gravity and escape the fluid. In the mean time, the well liquids, water and crude oil, are dawn downwardly through the outer annulus 46 and enter the liquid inlet 22 holes formed through the bottom of the elongated separator tube 28 wall. From there, the liquids flow upwardly in the inner annulus 48 defined between the fluid conduit 40 and the elongated separator tube 38. The liquids travel upward in the inner annulus 48 to the outlet manifold 42. The liquids then pass though the second passage of the outlet manifold 42, referred to as the liquid passage 52, and exit the gas anchor 2 through the outlet fitting 44 and the liquid outlet 46, and into the pump 8, passing through the stationary valve 26 on each pump upstroke.

Figure 4:
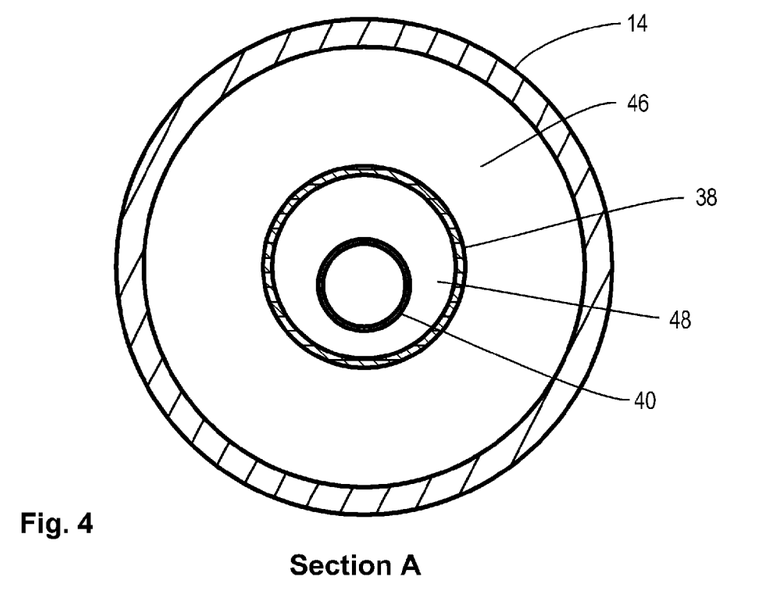
FIG. 4 is a cross section of the gas anchor in FIG. 2, and according to an illustrative embodiment of the present invention.

Reference is directed to FIG. 4, which is a cross section, labeled "Section A", of the gas anchor in FIG. 2, and according to an illustrative embodiment of the present invention. This view shows the relative use of cross sectional area of the various flow channels in the gas anchor along the elongated separator tube 38. The outer annulus 46 has the largest area, and is disposed between the inside wall of the casing 14 and the outside wall of the elongated separator tube 38. The inner annulus 48 is smaller, and defined between the inside wall of the elongated separator tube 38 and the outside wall of the fluid conduit 40.

Figure 5:
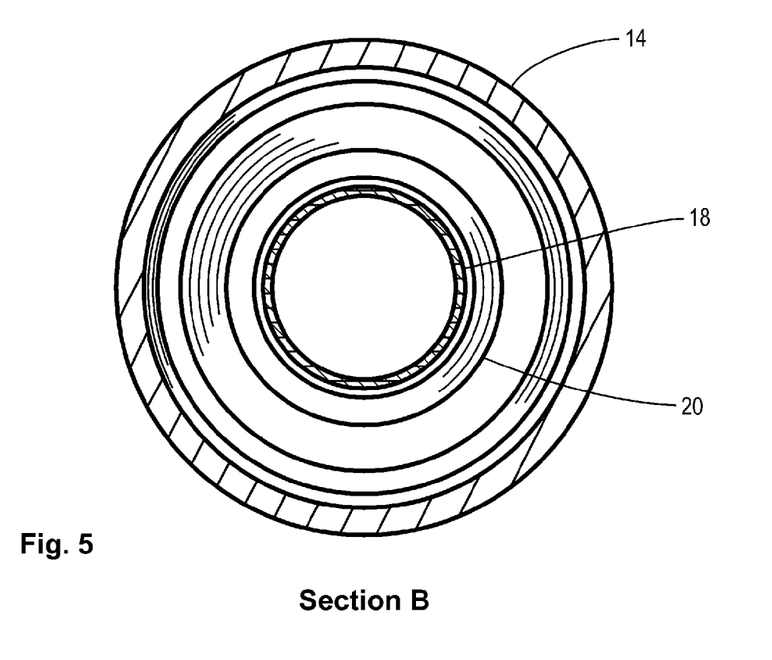
FIG. 5 is a cross section of the diverter assembly in FIG. 2, and according to an illustrative embodiment of the present invention.

Reference is directed to FIG. 5, which is a cross section, labeled "Section B", of the diverter assembly in FIG. 2, and according to an illustrative embodiment of the present invention. The casing 14 is visible in section, and so too is the draw tube 18. The diverter disc 20, blocks flow through the annulus between the draw tube 18 and the well casing 14, thereby isolating flow of raw well fluids thereby. Rather, all raw well fluids are diverted, and must pass through the draw tube 18.

Figure 6:
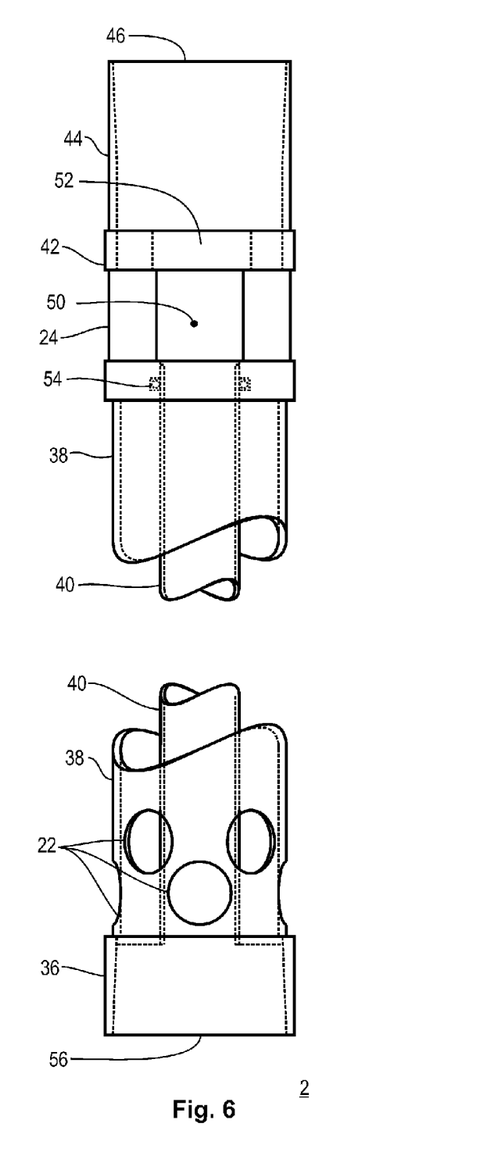
FIG. 6 is a front view of a gas separator according to an illustrative embodiment of the present invention.
Figure 7:
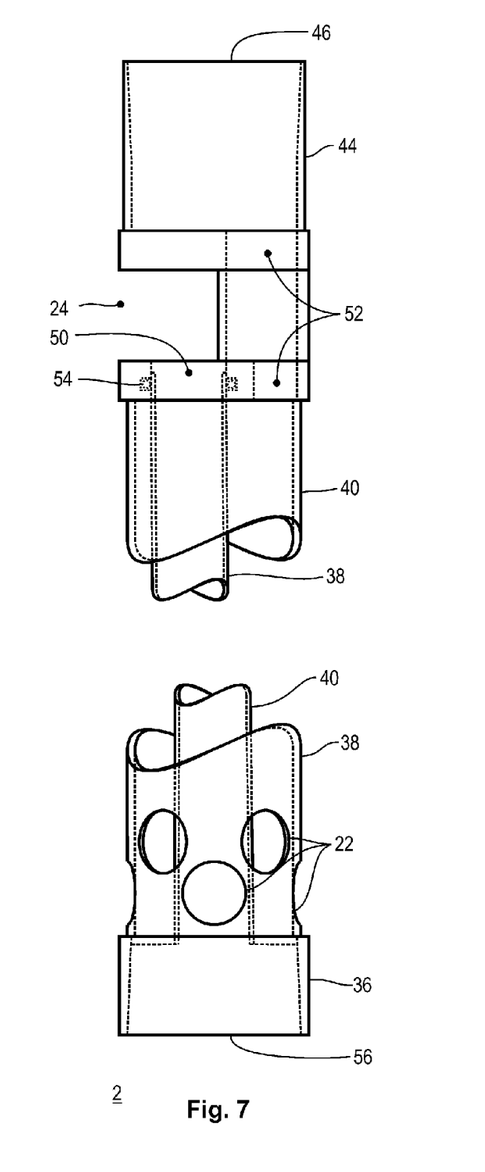
FIG. 7 is a side view of a gas separator according to an illustrative embodiment of the present invention.

Reference is directed to FIG. 6 and FIG. 7, which are a front view and a side view, respectively, of the gas separator 2 according to an illustrative embodiment of the present invention. These figures are provided to clarify some of the construction details of the illustrative embodiment gas anchor 2 portion of the diverter assembly. The material of fabrication of the illustrative embodiment is Type 316 stainless steel. Other materials deemed suitable in strength, cost, corrosion and erosion resistance for the fluids and operating environment at issue may also be employed. The outlet coupling 44 is a treaded coupling sized to accommodate the threads of the pump to be connected, or to match a threaded nipple that may be employed. The upper end of the outlet coupling 44 is the liquid outlet 46 of the gas anchor 2. The outlet manifold 42 is a fabricated component, and is further detailed in FIG. 8 hereafter. The outlet manifold provides a sealed fluid coupling to the elongated separator tube 38 and the fluid conduit 40. There are two passages formed through the outlet manifold 42, and these include the liquid outlet passage 52 and the fluid outlet passage 50. The liquid outlet passage 52 connects the outlet coupling 44, and the fluid passage 50 couples to the fluid outlet 24. The fluid conduit 40 in the illustrative embodiment is sealed to the outlet manifold using an O-ring 54. The elongated separator tube 38 is welded to the outlet manifold 42 for structural integrity.

The elongated separator tube 38 and the fluid conduit 40 are coextensive with one another down to the inlet fitting 36. The benefit of this coextensive arrangement is to yield a compact gas anchor that still provides adequate vertical length along the elongated separator tube 38 to yield good gas separation performance. The longer a gas anchor is, the more distance is needed in the well between the perforations to the formation and the liquid level under which the assembly is placed. Keeping the gas anchor length shorter allows the operator to draw down fluids to a lower level and somewhat improves well production rates. In the illustrative embodiment, this length is sixty inches, and it has been determined that the range from forty-eight to one hundred twenty inches is a suitable for good performance in modern oil wells. Also, placing the fluid conduit 40 inside the separator tube 38 enables the aforementioned outer annulus to be as large as practicable. This arrangement also yields a streamlined overall structure that installs cleanly without undue protuberances that may catch on other well components during installation and removal. Keeping a streamlined configuration of the outlet manifold 42 also assists in this regard. In the illustrative embodiment, the diameters of all components are limited to no more than ten percent of the separator tube 38 diameter, so as to achieve the streamlined configuration. Furthermore, the fluid outlet 24 to the outer annulus is aligned along the outer wall of the separator tube 38 so there are no protuberances required.

The elongated separator tube 38 is welded to the outlet fitting 36 for structural integrity. The outlet fitting 36 also seals the bottom of the elongated separator tube 38, with a fluid coupling to the fluid conduit 40, and this defines the bottom of the aforementioned inner annulus. The inlet coupling 36 is threaded to receive the draw tube (not shown), and the lower end of the inlet fitting 36 is the fluid inlet of the gas anchor 2. The lower end of the elongated separator tube 38 is perforated with plural holes 22, which are the liquid inlet to the aforementioned inner annulus. In the illustrative embodiment, eight holes are drilled through the wall of the elongated separator tube 38. In the illustrative embodiment, and for oil wells with 4" to 5.5" casing, a 2.5" diameter elongated separator tube 38 and a 1.5" diameter fluid conduit 40, have been found to be effective. Other design consideration would dictate other component dimensions.

Figure 8:
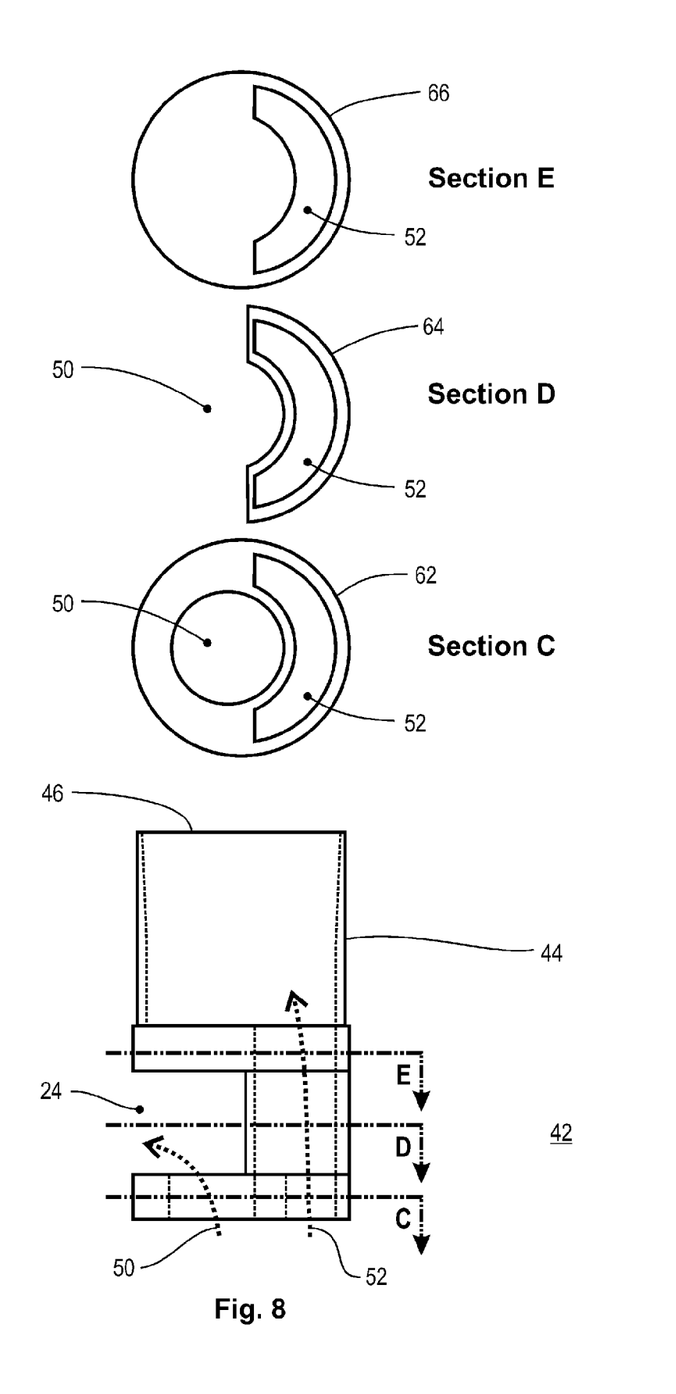
FIG. 8 comprises a detail view and cross sections of an outlet manifold of a gas anchor according to an illustrative embodiment of the present invention.

Reference is directed to FIG. 8, which comprises a detail view and cross sections A, B, and C, of an outlet manifold 42 of a gas anchor according to an illustrative embodiment of the present invention. These drawing figures provide fabrication details of the outlet manifold 42 in the illustrative embodiment. The outlet manifold is comprised of four components, a lower plate 62, a passage adapter 64, an upper plate 66 and an outlet coupling 44. In the illustrative embodiment these components are Type 316 stainless steel that is water-jet cut from plate and then welded together for structural integrity. The fluid passage 50 and the liquid passage 52 are established by the structure and arrangement of these components. More particularly, the lower plate 62 in Section C is formed with a round fluid passage 50 and an arcuate liquid passage 52. The passage adapter 64 in Section D is formed with the arcuate liquid passage 52. The upper plate 66 in Section E is formed with the arcuate liquid passage 52. They are welded as a stack, and then the outlet coupling 44 is welded to the upper plate 66, thereby providing an interface to the pump and the liquid outlet 46 of the gas anchor.

Figure 9:
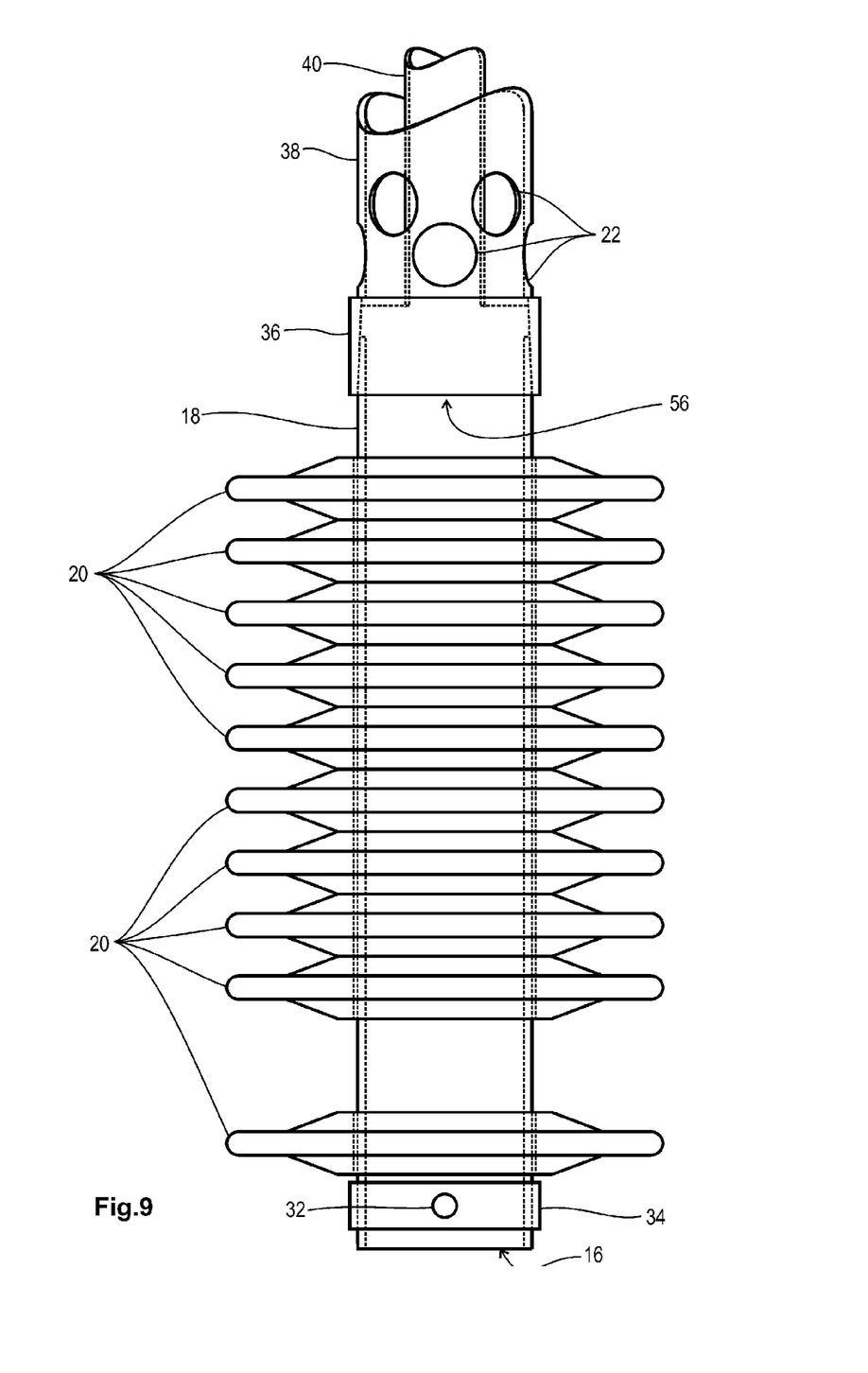
FIG. 9 is a drawing of the diverter assembly according to an illustrative embodiment of the present invention.

Reference is directed to FIG. 9, which is a drawing of the diverter assembly according to an illustrative embodiment of the present invention. The diverter assembly comprises a draw tube 18 that threadably engages the aforementioned inlet fitting 38 attached to the bottom of the elongated draw tube 38 and fluid conduit 40 of the gas anchor. The liquid inlet ports 22 are also visible in FIG. 9. Other connections could be employed, such as flanges, compression, welded, and others. The draw tube 18 is a 2.5" diameter stainless steel tube in the illustrative embodiment, but other suitable materials and sized could be employed. Plural diverter discs 20, which will be described hereinafter, are disposed on the exterior of the draw tube 18. In the illustrative embodiment, the diverter discs 20 slide onto the draw tube 18, and can shifter vertically between the inlet fitting 36 and a lower retaining collar 34. The number of discs 20 employed in the diverter assembly is a design choice, and can range from one up to the number that will fit on any given length of draw tube. As more discs that are added, the more resistance to well fluid passage by the diverter assembly increases. In the illustrative embodiment, ten discs 20 are employed. The retention collar 34 is fixed to the lower end of the draw tube 18 adjacent to the fluid blend inlet 16. The collar 34 is retained by shear pins, as has been discussed hereinbefore.

Figure 10:
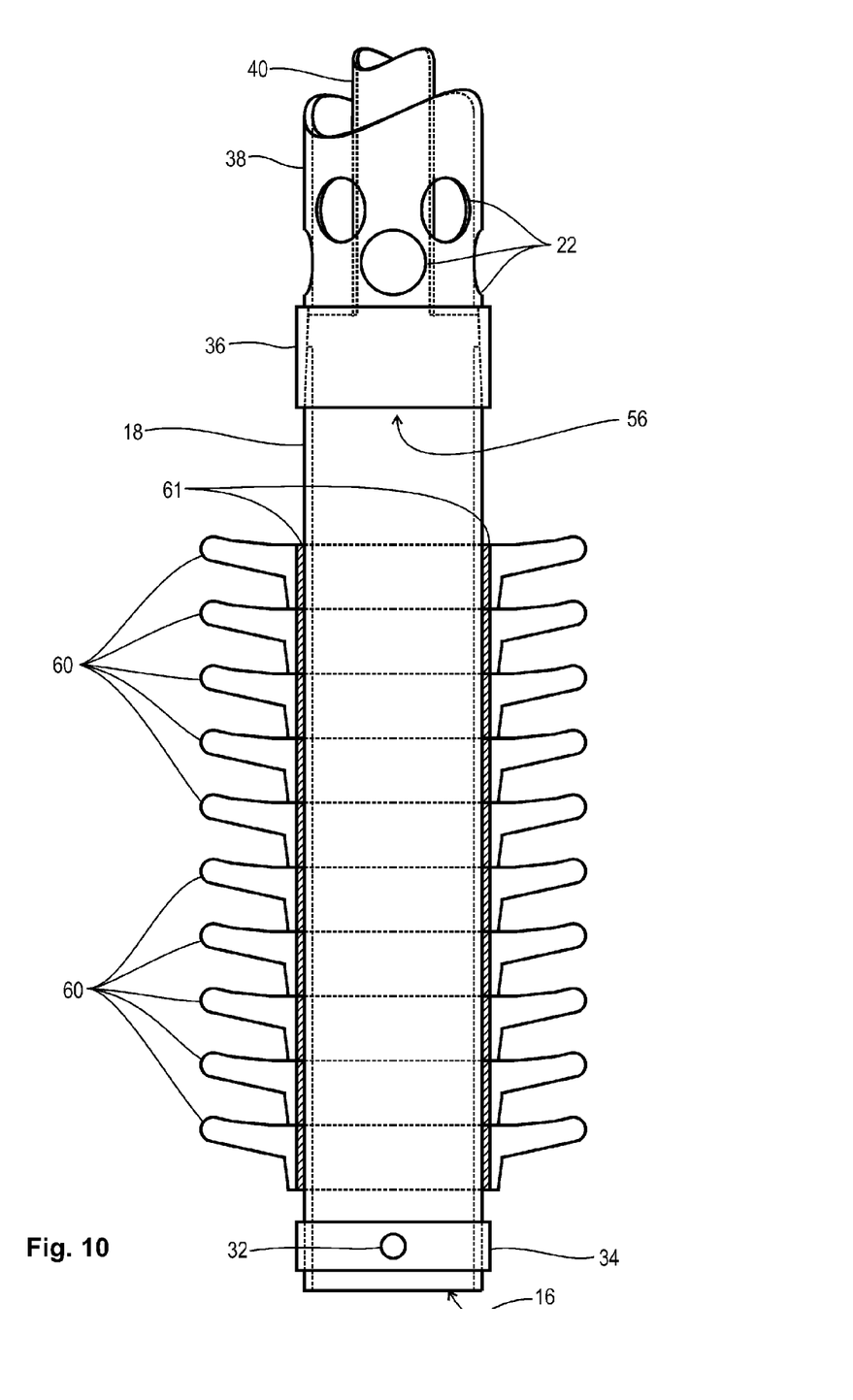
FIG. 10 is a partial section view of a diverter assembly according to an illustrative embodiment of the present invention.

Reference is directed to FIG. 10, which is a partial section view of a diverter assembly according to an illustrative embodiment of the present invention. FIG. 10 is similar to FIG. 9, so the common features will not be described again. In FIG. 10, cupped diverter discs 60 are employed. These discs 60 are also somewhat smaller in outside diameter to adapt the gas separator to a smaller diameter well casing (not shown). In FIG. 10, the diverter discs 60 are illustrated in section view to show the metal sleeve 61 disposed on the inside diameter. The cupped shape of diverter discs 60 facilitates the insertion of the diverter assembly into the well because the discs 60 naturally flex upwardly with less force.

Figure 11A:
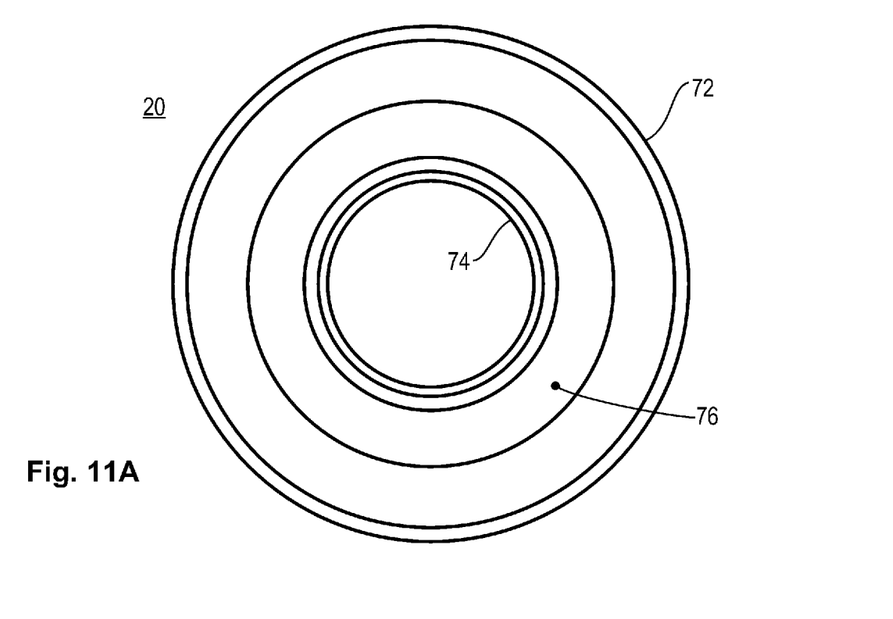
FIGS. 11A, B, and C are detailed views of a separator disc according to an illustrative embodiment of the present invention.
Figure 11B:
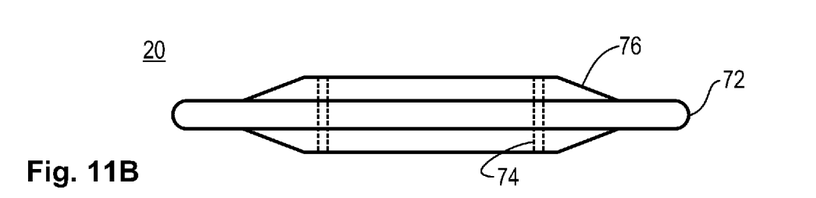
Figure 11C:
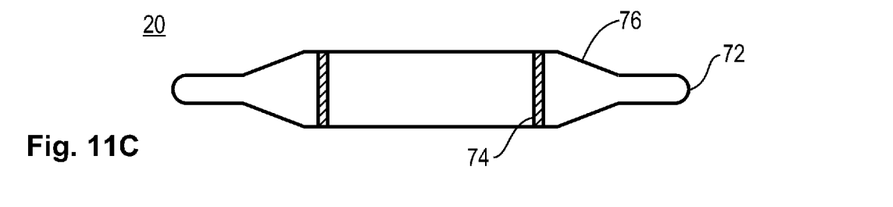

Reference is directed to FIGS. 11A, B, and C, which are detailed views, including a top view 11A, a side view 11B, and a section view 11C, of a flat separator disc 20 according to an illustrative embodiment of the present invention. The diverter disc 20 is molded from a polymeric material that is suitable for use with crude oil and has strength, flexibility, and abrasion resistance, such as polyethelene, acetal, fluoropolymers or fluoroethelenes. The outer rim 72 of the disc is rounded to facilitate sliding movement along the interior surface of the well casing (not shown). The disc tapers 76 to a greater thickness towards it interior so there is adequate area to support an embedded stainless steel sleeve 74. The sleeve 74 engages and supports the disc 20 to the draw tube (not shown).

Figure 12A:
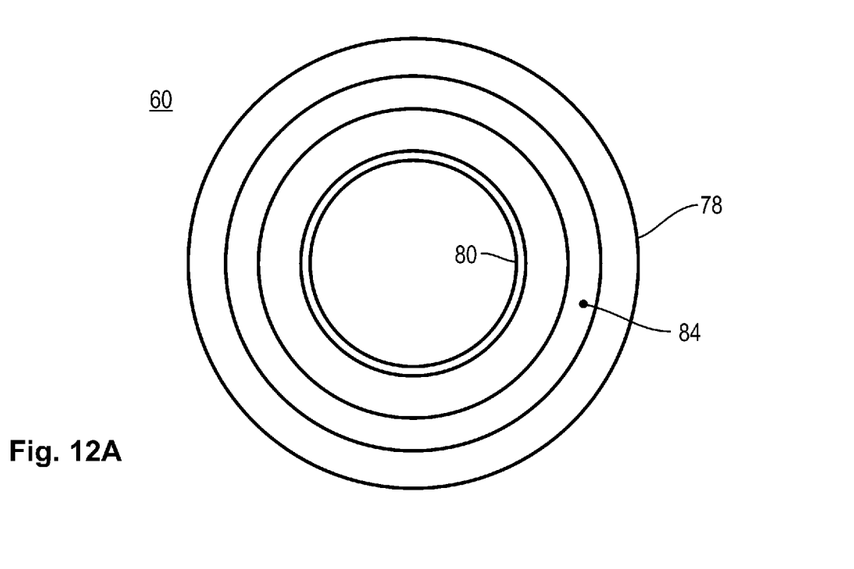
FIGS. 12A, B, and C are detailed views of a separator disc according to an illustrative embodiment of the present invention.
Figure 12B:
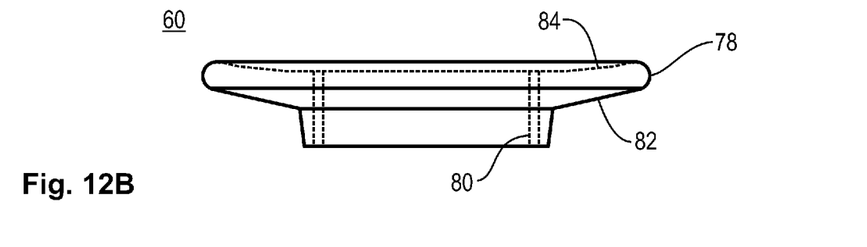
Figure 12C:
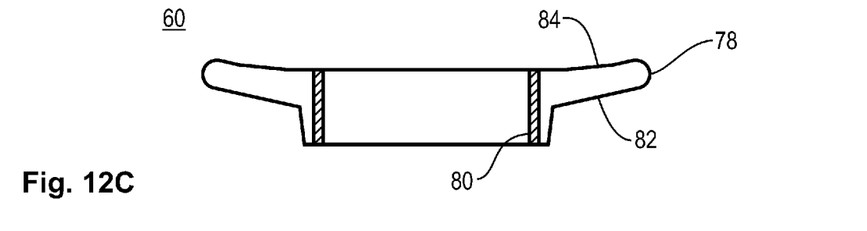

Reference is directed to FIGS. 12A, B, and C, which are detailed views, including a top view 12A, a side view 12B, and a section view 12C, of a separator cupped disc according to an illustrative embodiment of the present invention. The diverter disc 60 is molded from a polymeric material that is suitable for use with crude oil and has strength, flexibility, and abrasion resistance, such as polyethelene, acetal, fluoropolymers or fluoroethelenes. The outer rim 778 of the disc is rounded to facilitate sliding movement along the interior surface of the well casing (not shown). The disc is cupped and tapers along its upper 84 and lower 82 surfaces, and increases in thickness towards it interior so there is adequate area to support an embedded stainless steel sleeve 80. The sleeve 80 engages and supports the disc 60 to the draw tube (not shown).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A gravity fluid separator apparatus for insertion into a casing containing a fluid blend including a liquid portion and a gaseous portion, comprising:
   an elongated separator tube with a lower end and an upper end, and having a liquid inlet opening formed through a side wall thereof, which is located adjacent to said lower end, and wherein said elongated separator tube defines an outer annulus when inserted into the casing;
   a fluid conduit disposed within said elongated separator tube, with a length substantially coextensive therewith, and which defines an inner annulus therebetween;
   an inlet fitting sealably disposed at said lower end of said elongated separator tube, and fluidly coupled to said fluid conduit;
   an outlet manifold sealably disposed at said upper end of said elongated separator tube, and having a fluid passage that fluidly couples said fluid conduit to said outer annulus through a fluid outlet that is aligned along said side wall, and said outlet manifold further having a liquid passage fluidly coupling said inner annulus to a liquid outlet directed upwardly at said upper end;
   a draw tube coupled to said inlet fitting, and which extends downwardly to a fluid blend inlet end;
   a casing flow diverter disposed on the exterior of said draw tube, and slideable along the exterior thereof, and proportioned to slideably engage the casing, thereby resisting the movement of the fluid blend thereby while allowing said draw tube to move along a longitudinal axis of the casing, and wherein
   a pressure differential between said liquid outlet and said fluid blend inlet induces fluid flow, which urges the fluid blend into said fluid blend inlet, to pass through said inlet fitting and upwardly through said fluid conduit, and through said fluid passage and into said outer annulus through said fluid outlet, and wherein
   gravity induces most of the gaseous portion within said outer annulus to rise, while said differential pressure induces the liquid portion to travel downwardly through said outer annulus and enter said inner annulus through said liquid inlet opening, and to further flow upwardly through said inner annulus, passing through said liquid passage and upwardly out of said liquid outlet.

2. The apparatus of claim 1, and wherein:
   said liquid inlet opening consists of plural holes formed through said sidewall of said elongated separator tube.

3. The apparatus of claim 1, and wherein:
   said elongated separator tube and said fluid conduit have round cross sections.

4. The apparatus of claim 1, and wherein:
   said inlet fitting threadably engages said draw tube.

5. The apparatus of claim 1, and wherein:
   said outlet manifold further comprises an outlet coupling disposed about said liquid outlet.

6. The apparatus of claim 5, and wherein:
   said outlet coupling is threaded to engage the suction inlet of a pump.

7. The apparatus of claim 1, and wherein:
   said draw tube further comprises a collar disposed about its exterior surface and adjacent to said fluid blend inlet for retaining said diverter on said draw tube.

8. The apparatus of claim 7, and wherein:
said collar is located on said draw tube by a shear pin, thereby enabling said diverter to slide off said draw tube in the presence of excessive shear forces.

9. The apparatus of claim 1, and wherein:
said elongated separator tube has a length within the range of forty-eight to one-hundred twenty inches.

10. The apparatus of claim 1, and wherein:
said elongated separator tube has a length of approximately sixty inches.

11. The apparatus of claim 1, and wherein:
said casing flow diverter is configured as a disc having an outer diameter selected to fit within an interior diameter of the casing, and having a mounting hole formed therethrough sized to engage an exterior surface of said draw tube.

12. The apparatus of claim 11, and wherein:
said disc is formed of a polymeric material.

13. The apparatus of claim 12, and wherein:
said mounting hole includes a metal liner.

14. The apparatus of claim 12, and wherein:
said polymeric material is selected from selected from polyethylene, acetyl, fluoropolymers and fluoroethelenes.

15. The apparatus of claim 11, and wherein:
said diverter is comprised of plural discs.

16. The apparatus of claim 11, and wherein:
said disc is cupped to facilitate insertion into the casing.

17. The apparatus of claim 1, and wherein:
the outer diameter of said draw tube, said inlet fitting, and said outlet manifold are within ten percent of the outer diameter of said elongated separator tube, thereby facilitating insertion and removal of the gravity fluid separator apparatus with the casing.

18. The apparatus of claim 1, and wherein the casing is a subterranean hydrocarbon well casing, and the fluid blend contains crude oil, water, and natural gas, and wherein the fluid blend is withdrawn from the casing by a pump with a suction inlet, and wherein:
said liquid outlet is coupled to the suction inlet, thereby enabling the pump to induce said pressure differential to induce flow.

19. The apparatus of claim 18, wherein the natural gas rise velocity within the liquid portion is known to be approximately six inches per second, and wherein:
the cross sectional area of said outer annulus and the rate of flow induced by the pump are selected to result in a rate of downward flow through said outer annulus that is less than the natural gas rise velocity within the liquid, thereby enabling the gaseous portion to escape from the liquid portion prior to entering said liquid inlet.

20. A downhole diverter gas and liquid separator for connection to a suction inlet of a downhole pump, and insertion into a well-bore casing, and for separating well fluids including natural gas and well liquids consisting of crude oil and water, the apparatus comprising:
an elongated separator tube with a lower end and an upper end, and having a well liquid inlet formed as plural holes through a side wall thereof, which are located adjacent to said lower end, and wherein said elongated separator tube defines an outer annulus when inserted into the well-bore casing;
a fluid conduit disposed within said elongated separator tube, with a length substantially coextensive therewith, and which defines an inner annulus therebetween;
an inlet fitting sealably disposed at said lower end of said elongated separator tube, and fluidly coupled to said fluid conduit;
an outlet manifold sealably disposed at said upper end of said elongated separator tube, and having a well fluid passage that fluidly couples said fluid conduit to said outer annulus through a well fluid outlet that is aligned along said side wall, and said outlet manifold further having a well liquid passage fluidly coupling said inner annulus to a well liquid outlet coupling configured to engage the suction inlet of the downhole pump;
a draw tube coupled to said inlet fitting, which extends downwardly to a well fluid inlet end;
a casing flow diverter disposed on the exterior of said draw tube, and slideable along the exterior thereof, and proportioned to slideably engage the well-bore casing, thereby resisting the movement of the well fluids thereby while allowing said draw tube to move along a longitudinal axis of the well-bore casing, and wherein
said well liquid outlet is adapted for coupling with the suction inlet of the pump, which can induce a pressure differential between said well liquid outlet and said well fluid inlet, and wherein
said pressure differential urges the well fluids into said well fluid inlet, to pass through said inlet fitting and upwardly through said fluid conduit, and through said well fluid passage and into said outer annulus through said fluid outlet, and wherein
gravity induces most of the natural gas within said outer annulus to rise, while said differential pressure induces the well liquids to travel downwardly through said outer annulus and enter said inner annulus through said well liquid inlet opening, and to further flow upwardly through said inner annulus, passing through said well liquid passage and upwardly out of said well liquid outlet and into the downhole pump.

21. The separator of claim 20, and wherein:
said elongated separator tube and said fluid conduit have round cross sections.

22. The separator of claim 20, and wherein:
said draw tube further comprises a collar disposed about its exterior surface and adjacent to said well fluid inlet for retaining said casing flow diverter on said draw tube.

23. The separator of claim 22, and wherein:
said collar is located on said draw tube by a shear pin, thereby enabling said casing flow diverter to slide off said draw tube in the presence of excessive shear forces.

24. The separator of claim 20, and wherein:
said elongated separator tube has a length of approximately sixty inches.

25. The separator of claim 20, and wherein:
said casing flow diverter is configured as a disc having an outer diameter selected to fit within an interior diameter of the well-bore casing, and having a mounting hole formed therethrough sized to engage an exterior surface of said draw tube.

26. The separator of claim 25, and wherein:
said disc is formed of a polymeric material, and said mounting hole includes a metal liner.

27. The separator of claim 25, and wherein:
said casing flow diverter is comprised of plural discs.

28. The separator of claim 25, and wherein:
said disc is cupped to facilitate insertion into the well-bore casing.

29. The separator of claim 25, and wherein:
the outer diameter of said draw tube, said inlet fitting, and said outlet manifold are within ten percent of the outer diameter of said elongated separator tube, thereby facilitating insertion and removal of the downhole gas anchor into and out of the well-bore casing.

30. The separator of claim 20, wherein the natural gas rise velocity within the well liquids is known to be approximately six inches per second, and wherein:

the cross sectional area of said outer annulus and the rate of flow induced by the downhole pump are selected to result in a rate of downward flow through said outer annulus that is less than the natural gas rise velocity within the well liquids, thereby enabling the natural gas to escape from the well liquids portion prior to entering said well liquid inlet.

* * * * *